(12) United States Patent
James

(10) Patent No.: US 6,954,639 B1
(45) Date of Patent: Oct. 11, 2005

(54) AUDIO PANEL WITH ENHANCED INTERCOM ISOLATION MODES

(75) Inventor: Timothy W. James, Olathe, KS (US)

(73) Assignee: Garmin Ltd., (KY)

( * ) Notice: Subject to any disclaimer, the term of this patent is extended or adjusted under 35 U.S.C. 154(b) by 513 days.

(21) Appl. No.: 10/095,381

(22) Filed: Mar. 12, 2002

(51) Int. Cl.[7] ............................................. H04Q 7/20

(52) U.S. Cl. .................. 455/431; 455/403; 455/418; 455/420; 455/66; 455/74.1; 379/159; 381/86

(58) Field of Search ................................ 455/431, 403, 455/418, 420, 66, 74.1; 379/159; 381/86

(56) References Cited

U.S. PATENT DOCUMENTS

| 3,999,015 A | * | 12/1976 | Snyder et al. ............... 379/171 |
| 5,808,661 A | * | 9/1998 | Infiesto et al. ........... 348/14.01 |
| 6,075,533 A | * | 6/2000 | Chang ........................ 345/786 |

* cited by examiner

Primary Examiner—Vivian Chin
Assistant Examiner—Sanh Phu
(74) Attorney, Agent, or Firm—Devon A. Rolf

(57) ABSTRACT

An audio panel (10) with enhanced intercom isolation modes. The audio panel (10) has four intercom isolation modes, including a Co-pilot isolation mode that enables a co-pilot to make private communications via a wireless telephone interface (54). The audio panel (10) also provides improved intercom switching circuitry and control devices that more effectively switch between the four intercom isolation modes.

19 Claims, 1 Drawing Sheet

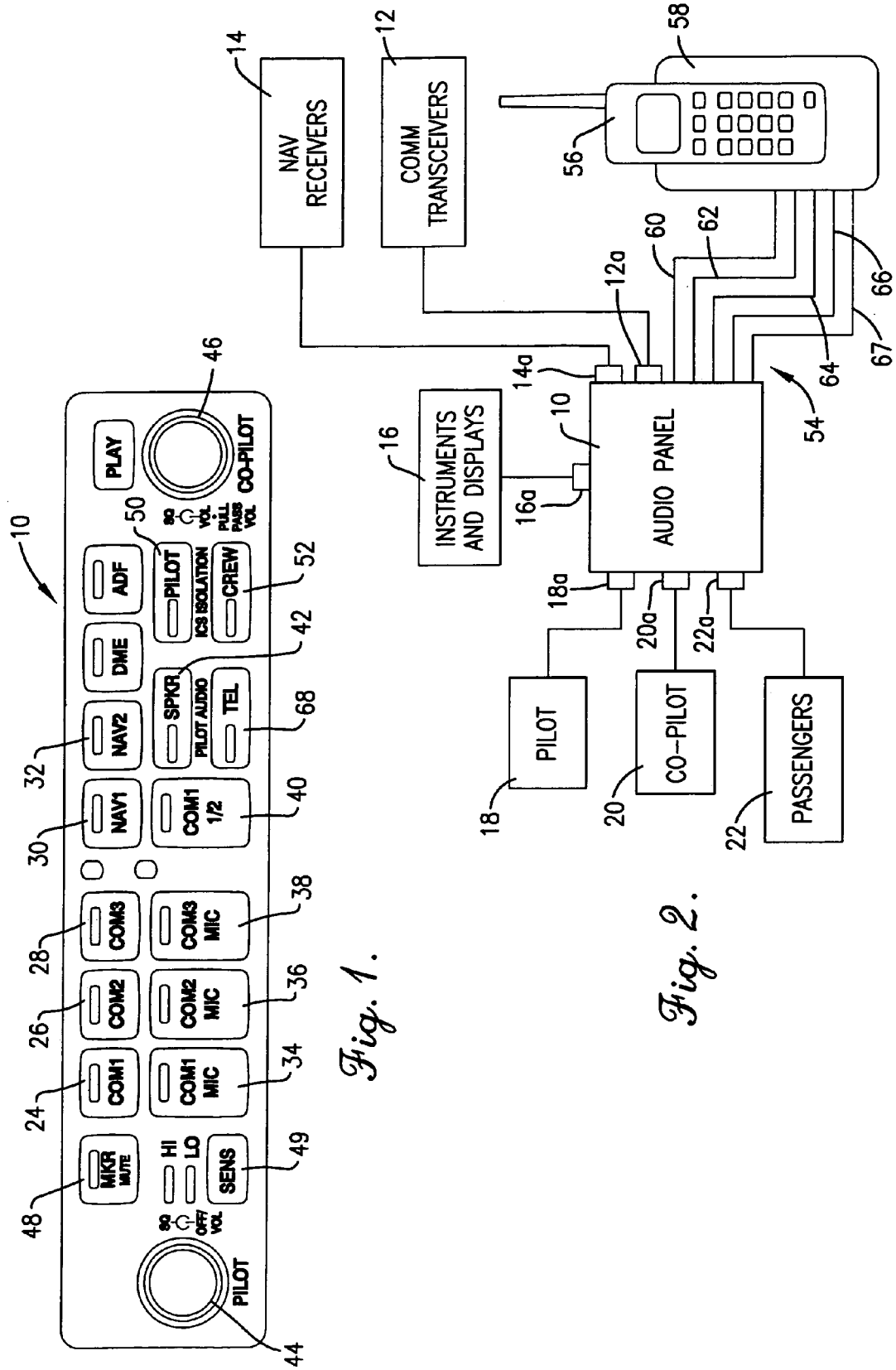

AUDIO PANEL WITH ENHANCED INTERCOM ISOLATION MODES

BACKGROUND OF THE INVENTION

1. Field of the Invention

The present invention relates to aircraft communications systems. More particularly, the invention relates to an audio panel for switching audio communications in an aircraft and having enhanced intercom isolation modes for more effectively isolating communications to selected people in the aircraft.

2. Description of the Prior Art

Aircraft frequently receive and transmit communications and navigation signals over a plurality of communication and navigation channels. To simplify the selection and use of different communication and navigation channels, most aircraft include one or more audio panels that include circuitry and controls for switching between the various available communications and navigation channels.

Conventional audio panels include intercom isolation circuitry having several isolation modes that permit audio communications to be selectively delivered to certain people in the aircraft such as the pilot and/or crew and isolated from others such as passengers. Unfortunately, the isolation modes provided by prior art audio panels suffer from several limitations that limit their utility. For example, prior art audio panels typically include an isolation mode that isolates the pilot from everyone else and an isolation mode that isolates the pilot and co-pilot from the passengers, but not an isolation mode that isolates the co-pilot from the pilot and passengers. This is a problem when a co-pilot needs to make a private communication without disturbing the pilot and passengers.

Another problem with the isolation modes of prior art audio panels is that they are typically controlled by multi-position rotary switches. These rotary switches have a finite number of switch positions and therefore cannot be easily configured to provide additional or different isolation modes. Moreover, these rotary-type switches only provide intercom isolation modes for selected communication channels. This is a problem when it is desired to add additional communication channels, such as a wireless phone input, to an audio panel because the rotary switches of known prior art audio panels cannot extend the isolation modes to the new communication channel. Thus, audio communications made over a wireless phone coupled with a prior art audio panel can be heard by all communication stations in an aircraft.

Accordingly, there is a need for an improved audio panel that provides enhanced intercom isolation modes without the limitations set forth above.

SUMMARY OF THE INVENTION

The present invention solves the above-described problems and provides a distinct advance in the art of aircraft audio panels. More particularly, the present invention provides an audio panel with an intercom system having an additional isolation mode that allows a co-pilot to make private communications. The present invention also provides improved intercom switching circuitry and control devices to permit more effective switching and isolation of all types of audio communications, including wireless telephone calls. The present invention achieves the foregoing and other operations with a minimum number of components so as to minimize the number of buttons and other controls on already crowded audio panels.

An audio panel constructed in accordance with one preferred embodiment of the present invention broadly includes a communications port for coupling with a communications device such as a wireless phone, communication station ports for coupling with communication stations serving a pilot, a co-pilot, and passengers of an aircraft, and intercom switching circuitry coupled between the communications port and the communication station ports for selectively switching audio communications therebetween. The intercom switching circuitry includes an All isolation mode that connects audio communications to the pilot, co-pilot, and passengers, a Crew isolation mode that connects the audio communications only to the pilot and co-pilot, a Pilot isolation mode that connects the audio communications only to the pilot, and a Co-pilot isolation mode that connects the audio communications to the pilot and allows a co-pilot to make and receive telephone calls.

The present invention also allows the full capabilities and flexibility of the audio panel intercom system to be transferred to wireless phone calls. Specifically, the intercom isolation modes may be used in conjunction with a telephone interface and control device to add a wireless phone as an additional node on the intercom system without requiring individual hook switches at each communication station in the aircraft. The intercom switching circuitry may be operated to divide communication stations into separate loops and the control device may be activated to determine to which loop a phone call is connected.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is an elevational view of the front face of an audio panel constructed in accordance with a preferred embodiment of the present invention.

FIG. 2 is a schematic diagram depicting the connection of the audio panel to a wireless phone and various other instruments and controls in a typical aircraft.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, and particularly FIG. 1, an audio panel 10 constructed in accordance with a preferred embodiment of the invention is illustrated. The audio panel 10 is preferably designed for use in an aircraft and, as illustrated in FIG. 2, includes conventional ports, interfaces or wiring connectors (collectively referred to herein as "ports") for coupling with a plurality of audio communication (Comm) transceivers 12, a plurality of navigation (Nav) receivers 14, various conventional instruments and displays 16, and communication stations or jacks that in turn may be coupled with communication equipment 18, 20, 22 such as headphones operated or worn by a pilot, a co-pilot, and passengers of the aircraft, respectively.

Specifically, the audio panel includes at least a communications port 12*a*, a navigations receiver port 14*a*, an instrument/display port 16*a*, a pilot communication station port 18*a*, a co-pilot communication system port 20*a* and a passenger communication station port 22*a*.

Many of the features and functions of the audio panel 10 are similar to those provided with the GMA 340 audio panel manufactured and sold by Garmin International, Inc. of Olathe, Kans. 66062. For example, the audio panel 10 includes a plurality of LED-illuminated push button controls 24,26,28,30,32 that provide switching between the various Comm and Nav devices 12,14. Large buttons 34,36,38 activate the Comm microphones and audios for up to three Comm transceivers to simplify cockpit workload. The audio panel 10 may also include an LED-illuminated push button 40 that enables a Split Comm feature to allow the pilot to transmit/receive on Comm 1 and the co-pilot to transmit/receive on Comm 2. MASQ processing reduces ambient noise from the avionics inputs. A speaker button 42 is provided to monitor the aircraft radios.

The audio panel 10 may also include dual stereo music inputs and rotary controls 44, 46 that provide independent pilot, co-pilot, and passenger volume control. Each microphone input has a dedicated VOX circuit to ensure that only the active microphone is heard when squelch is broken. Special cabin noise de-emphasis circuitry enhances cockpit communications. A Marker Beacon Receiver/Indicator 48 with high/low sensitivity selections 49 and SmartMute marker audio muting are also provided.

The audio panel 10 may be mounted either horizontally (as illustrated in FIG. 1) or vertically. Surface mount technology provides shallow depth and light weight, which simplifies installation in the tightest aircraft spaces and saves limited panel space. Operation is available in 14 or 28 volts without voltage converters or dropping resistors. A photo cell may be provided for dimming of annunciators.

The audio panel 10 also includes a six-place VOX intercom system with intercom switching circuitry that provides four selectable modes of intercom isolation (ICS isolation modes). An All isolation mode connects audio communications to all the communications equipment 18, 20, 22 in the aircraft such as headphones worn or operated by the pilot, co-pilot, and passengers. A Crew isolation mode connects audio communications to the communications equipment 18,20 operated or worn by the pilot and co-pilot. A Pilot isolation mode connects audio communications only to the communications equipment 18 operated or worn by the pilot. In accordance with one important aspect of the present invention, the intercom system also includes a Co-pilot intercom isolation mode that isolates the co-pilot by connecting certain audio communications only to the communications equipment 20 worn by the co-pilot. For example, as described in more detail below, the Co-pilot isolation mode enables the co-pilot to privately make or receive a wireless telephone conversation. Because the pilot must listen to all selected Comm radios, the Co-pilot isolation mode does not isolate the pilot from the selected radios.

Advantageously, all four of the isolation modes described above are enabled by two simple push button switches: a Pilot push button switch 50 and a Cplt push button switch 52 instead of a multi-position rotary-type switch. To select the All isolation mode, neither the Pilot 50 nor the Cplt 52 button is activated or turned on. To select the Cplt isolation mode, both the Pilot 50 and the Cplt 52 buttons are activated. To activate the Pilot isolation mode, only the Pilot button 50 is activated, and to activate the Co-pilot isolation mode, only the Cplt button 52 is activated. This switching arrangement allows all four isolation modes to be individually enabled with only two push button switches and eliminates the need for a complicated rotary switch having four separate isolation mode positions.

The audio panel 10 also preferably includes a wireless telephone interface 54 (FIG. 2) and related control device 68 (FIG. 1). The interface 54 may be coupled with a wireless telephone 56 such as an analog, cellular, or digital PCS phone or a cradle 58 for the phone to add telephone calling capabilities to the audio panel 10. The interface 54 includes TEL IN 60, TEL IN RETURN 62, TEL MIC 64, TEL MIC RETURN 66, and TEL RING 67 lines to provide a dedicated telephone interface and ringing capabilities over the audio panel intercom system.

The control device 68 may be operated in conjunction with the intercom switching circuitry to control distribution of phone calls over the telephone interface 54. The telephone interface 54 and control device 68 are configured for adding the wireless phone 56 as a node on the intercom system. This eliminates the need to provide separate hook switches at each station in the aircraft and the associated limitations of such an arrangement as described in the prior art section above. This also allows a co-pilot to make or receive a private phone call when the intercom system is switched to the Co-pilot isolation mode.

The control device 68 is preferably a single push button switch having markings indicating its function such as "TEL", but may be any other type of selector switch. By using a single push button switch to control distribution of phone calls via the intercom switching circuitry, the number of buttons and other controls on the face of the audio panel 10 can be minimized.

Operation of the telephone interface 54 is closely linked to the operation of the intercom system. Telephone calls are initially made and received in a conventional manner. For example, a call may be made by dialing the appropriate digits on the wireless phone keypad and then pushing a Send or Talk button on the phone. Similarly, calls may be received by pushing a Talk or Send button when the phone rings. The telephone interface 54, through the TEL IN 60, TEL IN RETURN 62, TEL MIC 64, TEL MIC RETURN 66, and TEL RING 67 lines causes the ringing to be announced on the audio panel intercom system and places associated phone calls on the intercom system.

The telephone interface 54 and Tel button 68 enable the full capabilities and flexibility of the audio panel intercom system to be transferred to wireless phone calls. Specifically, the audio panel intercom system isolation modes are used in conjunction with the Tel button 68 to provide the telephone interface 54 as an additional node on the intercom system to eliminate the need for separate hook switches for each station or person on the aircraft. When the intercom system is switched to the All isolation mode, all intercom positions are connected, and the Tel button 68 controls the distribution of a wireless telephone call. When the Tel button 68 is switched to its on or selected position, a telephone call is added to the intercom system and all persons wearing or operating communications equipment coupled with the intercom system may participate in the phone call. When the Tel button 68 is switched to its off or unselected position, the telephone interface 54 is disabled and telephone calls provided by the wireless phone 56 are not present on the intercom system.

In Crew, Pilot, or Co-pilot isolation modes, the intercom system is divided into two separate loops. In the Crew isolation mode, the pilot and co-pilot share an intercom loop, while the passengers are on the opposite loop. In Pilot mode, the pilot is isolated in her own intercom loop while the passengers and co-pilot make up the opposite loop. In Co-pilot mode, the co-pilot is isolated from the pilot and passengers. In these three isolation modes, the Tel button 68 controls the distribution of a telephone call to the appropriate intercom loop. When the Tel button 68 is in its on or selected position, a telephone call is added to whichever loop includes the pilot. When the switch is in its off or unselected position, the call is added to the opposite loop.

The following table summarizes the intercom isolation modes as well as the distribution of phone calls received or made over the wireless phone 56 via the audio panel intercom system.

| ICS Mode | Pilot Button | Co-Pilot Button | Tel Button | Pilot Hears | Co-Pilot Hears | Passengers Hear |
|---|---|---|---|---|---|---|
| ALL | OFF | OFF | OFF | Selected Radios; Pilot; Co-pilot; Passengers; Music 1 | Selected Radios; Pilot; Co-pilot; Passengers; Music 1 | Selected Radios; Pilot; Co-pilot; Passengers; Music 1 |
|  | OFF | OFF | ON | Selected Radios; Pilot; Co-pilot; Passengers; Tel audio; Music 1 | Selected Radios; Pilot; Co-pilot; Passengers; Tel audio; Music 1 | Selected Radios; Pilot; Co-pilot; Passengers; Tel audio; Music 1 |
| CO-PILOT | OFF | ON | OFF | Selected Radios; Pilot; Passengers; Music 1 | Co-pilot; Tel audio; Music 2 | Selected Radios; Pilot; Passengers; Music 1 |
|  | OFF | ON | ON | Selected Radios; Pilot; Passengers; Tel audio; Music 1 | Co-pilot; Music 2 | Pilot; Passengers; Tel audio; Music 1 |
| PILOT | ON | OFF | OFF | Selected Radios; Pilot | Co-pilot; Passengers; Tel audio; Music 1 | Co-pilot; Passengers; Tel audio; Music 1 |
|  | ON | OFF | ON | Selected Radios; Pilot; Tel audio | Co-pilot; Passengers; Music 1 | Co-pilot; Passengers; Music 1 |
| CREW | ON | ON | OFF | Selected Radios; Pilot; Co-pilot; Music 1 | Selected Radios; Pilot; Co-pilot; Music 1 | Passengers; Tel audio; Music 2 |
|  | ON | ON | ON | Selected Radios; Pilot; Co-pilot; Tel audio; Music 1 | Selected Radios; Pilot; Co-pilot; Tel audio; Music 1 | Passengers; Music 2 |

In the modes of operation where both a selected Comm audio channel and the telephone audio are heard, the telephone audio input will be muted whenever a transmission is received on the primary Comm channel, as well as when a transmission is made on the primary Comm channel. This muting does not occur for anyone who is interfacing with the telephone but does not hear the primary Comm channel.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An audio panel for switching audio communications in an aircraft, the audio panel comprising:

a communications port for coupling with a communications device for receiving audio communications therefrom;

a pilot communication station port for coupling with a pilot communication station;

a co-pilot communication station port for coupling with a co-pilot communication station;

a plurality of passenger communication station ports for coupling with a plurality of passenger communication stations; and an intercom system having intercom switching circuitry coupled between the communications port, and the pilot, co-pilot, and passenger communications ports for selectively switching the audio communications to the pilot, co-pilot, and passenger communications stations;

the intercom switching circuitry including— an All isolation mode that connects the audio communications to the pilot, co-pilot, and passenger communications stations, a Crew isolation mode that connects the audio communications to the pilot and co-pilot communication stations, a Pilot isolation mode that connects the audio communications only to the pilot communication station, and a Co-pilot isolation mode that connects certain two-way audio communications only to the co-pilot communication station so that only the Co-pilot may listen and respond to the audio communications.

2. The audio panel as set forth in claim 1, the intercom system further including first and second push button coupled with the intercom switching circuitry for permitting selective switching between the All, Crew, Pilot, and Co-pilot isolation modes.

3. The audio panel as set forth in claim 2, wherein the intercom switching circuitry is switched to the All isolation mode when both the first and second push buttons are switched to their off positions.

4. The audio panel as set forth in claim 2, wherein the intercom switching circuitry is switched to the Crew isolation mode when both the first and second push buttons are switched to their on positions.

5. The audio panel as set forth in claim 2, wherein the intercom switching circuitry is switched to the Pilot Isolation mode when the first push button is switched to its on position and the second push button is switched to its off position.

6. The audio panel as set forth in claim 2, wherein the intercom switching circuitry is switched to the Co-pilot isolation mode when the first push button is switched to its off position and the second push button is switched to its on position.

7. The audio panel as set forth in claim 1, further including a telephone interface coupled with the intercom switching circuitry and adapted for coupling with a wireless phone, the telephone interface being configured for adding the wireless phone as a node on the intercom.

8. The audio panel as set forth in claim 7, a control device coupled with the telephone interface and the intercom switching circuitry for controlling distribution of telephone calls within the aircraft via the intercom system.

9. The audio panel as set forth in claim 7, the control device comprising a single push button switch.

10. The audio panel as set forth in claim 8, the intercom switching circuitry, the telephone interface, and the control device being operable to distribute a telephone call via the intercom switching circuitry without affecting switching of other audio communications by the audio panel.

11. A method of switching audio communications in an aircraft, the method comprising the steps of:
   receiving an audio communication from a source thereof;
   switching the audio communication with intercom switching circuitry to communications equipment worn by or operated by a pilot, a co-pilot, and passengers of the aircraft; and
   selectively isolating the audio communication with the intercom switching circuitry with—
      an All isolation mode that connects the audio communications to the pilot, co-pilot, and passenger,
      a Crew isolation mode that connects the audio communications to the pilot and co-pilot,
      a Pilot isolation mode that connects the audio communications only to the pilot, and
      a Co-pilot isolation mode that connects certain two-way audio communications only to the co-pilot so that only the Co-pilot may listen and respond to the audio communications.

12. The method as set forth in claim 11, further including the step of switching between the All isolation mode, Crew isolation mode, Pilot isolation mode, and Co-pilot isolation mode with first and second push buttons.

13. The method as set forth in claim 12, wherein the intercom switching circuitry is switched to the All isolation mode when both the first and second push buttons are switched to their off positions.

14. The method as set forth in claim 12, wherein the intercom switching circuitry is switched to the Crew isolation mode when both the first and second push buttons are switched to their on positions.

15. The method as set forth in claim 12, wherein the intercom switching circuitry is switched to the Pilot isolation mode when the first push button is switched to its on position and the second push button is switched to its off position.

16. The method as set forth in claim 12, wherein the intercom switching circuitry is switched to the Co-pilot isolation mode when the first push button is switched to its off position and the second push button is switched to its on position.

17. The audio panel as set forth in claim 2, the intercom system further including first and second intercom loops, wherein the passenger communication stations share the first loop and the pilot and co-pilot communication stations can be selectively switched from the first loop to the second loop using the push buttons.

18. The method as set forth in claim 12, the intercom system further including first and second intercom loops, wherein the passengers share the first loop and the pilot and co-pilot can selectively switch from the first loop to the second loop using the push buttons.

19. An audio panel for switching audio communications in an aircraft, the audio panel comprising:
   a communications port for coupling with a communications device for receiving audio communications therefrom;
   a pilot communication station port for coupling with a pilot communication station;
   a co-pilot communication station port for coupling with a co-pilot communication station;
   a plurality of passenger communication station ports for coupling with a plurality of passenger communication stations;
   an intercom system having intercom switching circuitry coupled between the communications port, and the pilot, copilot, and passenger communications ports for selectively switching the audio communications to the pilot, co-pilot, and passenger communications stations;
   the intercom switching circuitry including—
      an All isolation mode that connects the audio communications to the pilot, co-pilot, and passenger communications stations,
      a Crew isolation mode that connects the audio communications to the pilot and co-pilot communication stations,
      a Pilot isolation mode that connects the audio communications only to the pilot communication station, and
      a Co-pilot isolation mode that connects certain audio communications only to the co-pilot communication station; and
   the intercom system further including first and second intercom loops, wherein the passenger communication stations share the first loop and the pilot and co-pilot communication stations can be selectively switched from the first loop to the second loop.

* * * * *